United States Patent [19]

Foust

[11] Patent Number: 5,520,901
[45] Date of Patent: May 28, 1996

[54] METHOD FOR THE RECOVERY OF IODINE FROM AN ENVIRONMENT

[75] Inventor: Donald F. Foust, Scotia, N.Y.

[73] Assignee: General Electric Company, Schenectady, N.Y.

[21] Appl. No.: 94,723

[22] Filed: Jul. 21, 1993

[51] Int. Cl.$^6$ .................... C01B 7/00; C01F 5/26; C01F 11/20
[52] U.S. Cl. .................... 423/500; 423/497; 423/504
[58] Field of Search ................ 423/99, 101, 109, 423/497, 500, 555, 499.1, 551, 554, 504

[56] References Cited

U.S. PATENT DOCUMENTS

| | | | |
|---|---|---|---|
| 217,076 | 7/1879 | Dubreuil | 423/497 |
| 1,516,917 | 11/1924 | Freundler | 423/500 |
| 1,689,775 | 10/1928 | Chandler | 423/497 |
| 2,385,483 | 9/1945 | Wolff | 423/500 |
| 2,918,400 | 12/1959 | Loonam | 423/504 |
| 3,627,482 | 12/1971 | Olson et al. | 423/109 |
| 3,726,937 | 4/1973 | Stepanov et al. | 423/499.1 |
| 4,131,645 | 12/1978 | Keblys et al. | 423/501 |
| 4,233,274 | 11/1980 | Allgulin | 423/210 |
| 5,137,700 | 8/1992 | Sloan | 423/34 |
| 5,226,545 | 7/1993 | Foust | 209/3 |

FOREIGN PATENT DOCUMENTS

| | | | |
|---|---|---|---|
| 780788 | 3/1968 | Canada | 423/501 |
| 27-4464 | 10/1952 | Japan | 423/500 |
| 1-108101 | 4/1989 | Japan | 423/500 |
| 2-280815 | 11/1990 | Japan | 423/210 |

*Primary Examiner*—Steven Bos
*Attorney, Agent, or Firm*—Noreen C. Johnson; James Magee, Jr.

[57] ABSTRACT

A method of removing iodine from an environment which had been previously treated with a composition containing iodine and an iodide salt is disclosed. The method involves the addition to the environment of at least one reagent which is a metal sulfite salt or a hydroxide-producing compound, in an amount sufficient to water-solubilize substantially all of the iodine, followed by recovery of the iodine. This technique is particularly useful for recovering iodine from extractant solutions used in the removal of mercury from contaminated materials.

7 Claims, No Drawings

METHOD FOR THE RECOVERY OF IODINE FROM AN ENVIRONMENT

FIELD OF THE INVENTION

This invention relates in general to environmental treatment techniques, and more particularly, to methods for the recovery of iodine from treatment solutions.

BACKGROUND OF THE INVENTION

Mercury has many useful applications in industry. However, its toxic nature can create serious problems when this element is released to the environment, e.g., to landfills, soil, sand, gravel, building materials, and the like.

One particularly effective method for the extraction of mercury from contaminated solid materials is described in U.S. Pat. No. 5,226,545. The method involves treatment of contaiminated solid material, e.g., phenolic plastic parts, with a liquid oxidant-complexing agent composition which oxidizes the mercury to form which can be solubilized by the complexing agent. The mercury-containing liquid phase is then separated from the solid material. It can be further treated to regenerate the oxidant-complexing agent composition and convert soluble mercury to recoverable elemental mercury. A preferred oxidizing agent is iodine, while a preferred complexing agent is a water-soluble halide salt such as potassium iodide.

While the process described above is effective in extracting mercury, it can be commercially expensive. This is in large part due the loss of expensive oxidizing agents and complexing agents, such as iodine and iodine salts, during the process. The iodine-based materials are very soluble in organic materials such as phenolic plastics, and can be absorbed by the plastics during the decontamination process. Once absorbed, the iodine is unrecoverable, thereby decreasing the commercial feasibility of the overall process. Rinsing the treated solution with water (and preferably, at elevated temperature) sometimes results in the recovery of a portion of the lost iodine, but substantial amounts remain unaccounted for.

Some methods for the recovery of iodine are known in the art. For example, U.S. Pat. No. 4,131,645 describes a process to recover iodine from brine, through the use of a basic anion exchange resin. In an article by N. R. Dhar, a technique is described in which sodium formate is reacted with iodine, forming iodide salts which have very little affinity for organic resin solids [(J. Chem. Soc. (London), 111 (1917) 726].

There is still a great deal of interest in an effective, practical process of maximizing the recovery of iodine from an environment, e.g., from a mixture which had been previously treated with at least one iodine-based compound. Furthermore, the process should be compatible with related processes being carried out at the same site, such as a mercury remediation. The process should also permit the recycling of iodine-based reagents for further use.

SUMMARY OF THE INVENTION

The present invention addresses the needs discussed above. A primary embodiment is directed to a method of removing iodine from an environment which had been previously treated with a composition comprising iodine and an iodide salt. The method involves adding to the environment at least one reagent which is a metal sulfite salt or a hydroxide-producing compound in water, in an amount sufficient to water-solubilize substantially all of the iodine, followed by recovery of the iodine.

Another embodiment of this invention is directed to a method of extracting mercury from contaminated solids, using iodine-based components which are subsequently recovered as described below.

DETAILED DESCRIPTION OF THE INVENTION

The "environment" which can be treated by the present invention must be aqueous-based, but is virtually unlimited in other respects. For example, treatment can be performed on any watery mixture containing soils or solid waste materials along with iodine and iodide salts. One example of such a mixture is that resulting from the process described in U.S. Pat. No. 5,226,545. In such a process, an aqueous extractant composition containing iodine ($I_2$) and potassium iodide (KI) is added to a solid material such as phenolic resin which has been contaminated with mercury. After treatment with the extractant composition, the resulting mixture comprises water, the solid material, residual mercury, iodine, and iodide. The iodine is partially absorbed into the solid material, as described above.

The metal sulfite salts which may be used in the process of this invention are known in the art. Examples are sodium sulfite, lithium sulfite, potassium sulfite, calcium sulfite, calcium bisulfite, magnesium sulfite, and mixtures of any of the foregoing. The preferred compound of this group is calcium sulfite, since it has limited solubility in water, and its use will therefore not result in a substantial amount of soluble byproducts which interfere with the recycling of the iodine-based solution.

Lithium sulfite, potassium sulfite, sodium sulfite, and magnesium sulfite will function in this process on a short term basis. However, they are less desirable when the iodine solution is to be recycled, since these salts are very water-soluble, and tend to form water-soluble byproducts after reaction with the iodine. The presence of these byproducts can impede recovery of iodine. Furthermore, if these salts are used in the form of an aqueous solution, their shelf life may be somewhat limited due to their reaction with oxygen.

Examples of compounds which produce hydroxide ions in water are metal hydroxide bases, such as potassium hydroxide, calcium hydroxide, magnesium hydroxide, sodium hydroxide, lithium hydroxide, and mixtures of any of the foregoing. One advantage of using these compounds is their ability to neutralize acids which may form during treatment of the environment, thereby substantially preventing a build-up of extraneous metal compounds which can complicate recycling.

Calcium hydroxide is preferred for many embodiments, in part due to its limited solubility in water. Compounds such as sodium hydroxide and potassium hydroxide will usually function in this process on a short term basis, but may not be suitable if the iodine solution is to be recycled, since they tend to react with some of the solid materials in solution, such as phenolic resin solids. These "side reactions" may lead to undesirable soluble byproducts which impeded iodine isolation and recovery.

Magnesium hydroxide also functions in this process, but is sometimes not as preferred as calcium hydroxide. The reaction of magnesium hydroxide in water does not produce the basicity necessary to recover as much iodine as that which can be recovered with calcium hydroxide.

Other examples of compounds which produce hydroxide ions in water are various carbonates and oxides. Calcium carbonate, magnesium carbonate, calcium oxide, and magnesium oxide are preferred. While sodium carbonate and potassium carbonate will function on a short term basis, their use may result in soluble byproducts which can impede iodine isolation, as mentioned above.

Combinations of the sulfite salts and hydroxide-producing compounds are also possible. For example, a combination of calcium hydroxide and calcium sulfite may be used. The ratio of sulfite salt to hydroxide-producing compound in such a combination is usually in the range of about 5:1 to about 1:5 (by weight), and more preferably, in the range of about 2:1 to about 1:2.

The amount of sulfite or hydroxide-producing compound employed should be at least stoichiometrically equivalent to the iodine being recovered. Techniques for determining how much iodine is present in an environment (and how much has been lost by absorption into solid materials) are known in the art. As an illustration based on U.S. Pat. No. 5,226,545, the amount of iodine can be determined by titration of a sample of the solution undergoing mercury decontamination, followed by calculations based on mass balance equations. In the case of calcium sulfite, reference to the following equation for reaction with iodine is instructive:

$$CaSO_3 + I_2H_2O \rightarrow CaSO_4 + 2I^- + 2H^-$$

In the case of calcium hydroxide, the following equation is instructive:

$$2Ca(OH)_2 + 2I_2 \rightarrow Ca(OI)_2 + CaI_2 + 2H_2O$$

Those of ordinary skill in the art would be able to readily determine the proper stoichiometric equivalent for any of the sulfite or hydroxide-producing compounds mentioned above. In practice, an excess of the compounds is used to ensure full reaction with any iodine which may be present.

The sulfite or hydroxide-producing compound is usually added to the environment as a solid. Water is also added (unless it is already in the particular environment) to allow for proper mixing, and to act as an extraction medium for the iodine. The amount of water used is not particularly critical, and depends on a variety of factors, such as the amount of solids contained in the environment being treated, and the size of the containers being used in that treatment. The weight ratio of water to solids contained in the environment is usually in the range of about 1:1 to 10:1, and more typically, is in the range of about 3:1 to 5:1.

The temperature of the environment being treated often has an effect on the rate at which iodine can be recovered. The environment should be maintained at a temperature in the range of about 20° C. to about 100° C. after addition of the sulfite or hydroxide-producing compound, and more preferably, at a temperature in the range of about 30° C. to about 65° C. Any conventional heating method may be employed. Mixing or other types of agitation are often used to maintain uniform temperature during treatment.

The time necessary for reaction between the sulfite or hydroxide-producing compound and the iodine species in the environment is in part related to the temperature levels discussed above. For example, longer reaction times can compensate for a lower treatment temperature. The reaction period is usually in the range of about 30 minutes to about 16 hours, and is most often within the range of about 30 minutes to about 6 hours.

In general, the environment should be maintained according to a temperature/time regimen which ensures that the solid materials in the environment being treated contain less than about 5% iodine on a weight basis, and more preferably, less than about 3% iodine, after treatment is complete. With this bench mark in mind, those of ordinary skill in the art can adjust both parameters without undue experimentation, taking into account other factors as well, such as energy consumption and productivity requirements. The examples at the end of this specification provide an illustration of parameters for particular materials and reaction conditions.

The environment can be washed with water and then filtered at the conclusion of treatment as described above. While the additional water-washing is not critical, it can sometimes serve to promote further contact between residual iodine species and the sulfite or hydroxide-producing compound. The water wash is usually carried out at a temperature between about 15° C. and 65° C., and more preferably, between about 20° C. and 45° C.

The process of this invention can also include sequential treatment with one or more sulfite or hydroxide-producing compounds, as described in an example which follows. As an illustration, a sulfite compound could be added to the environment, followed by the addition of a hydroxide-producing compound; and then washing and filtering the resulting mixture, as described above. The environment should be maintained at a relatively high pH, e.g., a pH of at least about 7, prior to separation of liquid and solid phases, in order to keep any byproducts in the solid phase, rather than with the iodine being recovered.

Recovery of the iodine after reaction with the sulfite or hydroxide-producing compound can readily be achieved by any conventional technique, e.g., precipitation, oxidation, ion-exchange, and the like.

The recovered iodine can of course be recycled for further use, e.g., as a primary component for the mercury-removal process described in U.S. Pat. No. 5,226,545. Iodine and iodide salts of course have a wide variety of other uses as well.

It should be apparent from the teachings set forth above that another embodiment of this invention includes an improved method for removing mercury from contaminated solid materials by using certain iodine-based components, followed by recovery of substantially all of the iodine used in the method. The method thus comprises:

a) treating the contaminated materials with an aqueous extractant-composition comprising (i) iodine in an amount sufficient to oxidize elemental mercury and any other mercury species to the mercuric oxidation state, and (ii) an iodide salt in an amount sufficient to form a water-soluble complex with mercuric compounds;

b) adding at least one reagent which is a metal sulfite salt or a hydroxide-producing compound in water to the treated composition of step (a), said reagent being added in an amount sufficient to water-solubilize substantially all of the iodine; and c) recovering the aqueous extractant composition and the solubilized iodine from the solid materials.

The metal sulfite salt or hydroxide-producing compound can be any of the compounds described above, or any combination thereof. Other details regarding the mercury-removal step are provided in U.S. Pat. No. 5,226,545. The following examples are provided to more fully describe this invention. They should be considered as illustrative of the invention, rather than limiting what is otherwise disclosed and claimed herein. All quantities are expressed in weight, unless otherwise indicated.

EXAMPLE 1

Prior to use of the iodine recovery process, an environment was treated to remove mercury according to the method described above: 5.0 grams of phenolic resin contaminated with an average of 225 ppm of mercury was treated twice with 50 mL of 0.15M KI/0.075M $I_2$ at 45° C. for about 6 hours. The mixture was then filtered, and the amount of missing iodine was calculated to be 0.18 gram (g) per gram of phenolic resin.

According to the present invention, the filtered material was then slurried with 50 mL of water and 3.9 g of calcium sulfite ($CaSO_3 \cdot 2H_2O$) at 45° C. for 16 hours. The resulting mixture was then filtered and washed with 50 mL of water for 1 hour at 22° C., filtered again, and dried. The solids contained 30 ppm mercury. 0.03 g iodine/g phenolic resin was unaccounted for after analysis of all solutions for iodine and iodide. This amount is a very substantial reduction from the initial amount of missing iodine, 0.18 g.

EXAMPLE 2

A series of additional samples were treated in a manner identical to that used in Example 1, using calcium sulfite but varying certain parameters. The results are provided in Table 1:

TABLE 1

Variation of Parameters When Using Calcium Sulfite

| Time (hr) | Temperature (°C.) | $gCaSO_3 \cdot 2H_2O$/ g Material* | Liquid/ Solid Ratio** | g Lost I/ g Material*** |
|---|---|---|---|---|
| 0 | — | 0 | — | 0.197 |
| 1 | 22 | 0.4 | 5 | 0.116 |
| 6 | 22 | 0.4 | 5 | 0.072 |
| 16 | 22 | 0.4 | 5 | 0.073 |
| 6 | 45 | 0.4 | 5 | 0.059 |
| 6 | 65 | 0.4 | 5 | 0.007 |
| 6 | 22 | 0.2 | 5 | 0.070 |
| 6 | 22 | 1.0 | 5 | 0.141 |
| 6 | 22 | 0.4 | 2 | 0.078 |
| 6 | 22 | 0.4 | 10 | 0.080 |

*Grams calcium sulfite per grams of phenolic-containing material in the sample initially.
**Weight ratio of water to solids contained in the sample.
***Amount of iodine which remains unaccounted for after analysis for any soluble iodine or iodide.

Table 1 demonstrates that parameters such as time and temperature can sometimes have an effect on the recovery or iodine.

EXAMPLE 3

In this example, sodium sulfite was used as the iodine-recovery agent. Initially, 5.0 g of phenolic resin contaminated with an average of 225 ppm mercury was treated twice with 50 mL of 0.15M KI/0.075M $I_2$ at 45° C. for 6 hours and filtered.

Various samples of the solids were then slurried with 50 mL of an aqueous solution of $Na_2SO_3$. As shown in Tables 2 and 3, various parameters were varied for each sample. The effect of these variations is noted in the last column of each table, i.e., the amount of unrecovered iodine.

TABLE 2

Variation of Parameters When Using Sodium Sulfite

| Time (hr) | Temperature (°C.) | Concentration of $Na_2SO_3$(M) | Liquid/ Solid Ratio** | g Lost I/ g Material*** |
|---|---|---|---|---|
| 0 | — | 0 | — | 0.13 |

TABLE 2-continued

Variation of Parameters When Using Sodium Sulfite

| Time (hr) | Temperature (°C.) | Concentration of $Na_2SO_3$(M) | Liquid/ Solid Ratio** | g Lost I/ g Material*** |
|---|---|---|---|---|
| 1 | 22 | 0.1 | 10/1 | 0.07* |
| 1 | 22 | 0.1 | 10/1 | 0.07 |
| 1 | 22 | 0.1 | 5/1 | 0.03 |
| 1 | 22 | 0.1 | 20/1 | 0.04 |
| 0.5 | 22 | 0.1 | 10/1 | 0.06 |
| 4 | 22 | 0.1 | 10/1 | 0.04 |
| 1 | 44 | 0.1 | 10/1 | 0.03 |
| 1 | 22 | 0.5 | 10/1 | <0.01 |
| 1 | 22 | 0.05 | 10/1 | 0.06 |

*This sample was not subjected to a water rinse after contact with the $Na_2SO_3$; all other samples were subjected to a water rinse for 1 hour at 22° C.
**Weight ratio of water to solids contained in the sample.
***Amount of iodine which remains unaccounted for after analysis for any soluble iodine or iodide.

TABLE 3

Further Variation of Parameters When Using Sodium Sulfite*

| Time (hr) | Temperature (°C.) | Concentration of $Na_2SO_3$(M) | Liquid/ Solid Ratio** | g Lost I/ g Material*** |
|---|---|---|---|---|
| 0 | — | 0 | — | 0.16 |
| 16 | 45 | 0.5 | 5/1 | 0.03* |
| 16 | 45 | 0.1 | 5/1 | 0.04 |
| 16 | 22 | 0.5 | 5/1 | 0.03 |
| 1 | 45 | 0.5 | 5/1 | 0.04 |
| 16 | 22 | 0.1 | 5/1 | 0.06 |
| 1 | 45 | 0.1 | 5/1 | 0.06 |
| 1 | 22 | 0.5 | 5/1 | 0.05 |
| 1 | 22 | 0.1 | 5/1 | 0.05 |

*After contact with the $Na_2SO_3$, all samples were subjected to a water rinse for 1 hour at 22° C.
**Weight ratio of water to solids contained in the sample.
***Amount of iodine which remains unaccounted for after analysis for any soluble iodine or iodide.

The data in Tables 2 and 3 demonstrate the effect of variations in the various parameters mentioned above. While it is clear that use of sodium sulfite was effective in recovering iodine, variation of parameters such as time and temperature usually did not have an appreciable effect on the amount of iodine recovery.

As described above, while sodium sulfite is effective on a short-term basis, it is not as preferred as calcium sulfite or calcium hydroxide if the iodine-containing solutions are to be recycled.

EXAMPLE 4

Calcium hydroxide is used in this example as the hydroxide-producing compound. 5.0 grams of phenolic resin contaminated with an average of 371 ppm mercury was treated with 50 mL of 0.26M KI/0.070M $I_2$ at 45° C for 1 hour and filtered. The solids were treated again with 50 mL of 0.26M KI/0.070M $I_2$ at 45° C. for 15 hours and filtered. Unaccounted iodine, i.e., iodine not in solution, was 0.165 g/g phenolic resin.

The solids were slurried with 50 mL water and 0.2 g $Ca(OH)_2$ at 65° C. for 3 hours, filtered, washed with 50 mL of water for 1 hour at 22° C., filtered again, and then dried. The solids contained 27 ppm mercury. Unaccounted iodine was 0.07 g I per gram of phenolic resin following analysis of all solutions for iodine and iodide.

EXAMPLE 5

A series of additional samples were treated in a manner identical to that used in Example 4, but changing certain parameters. The results are provided in Table 4:

TABLE 4

Variation of Parameters When Using Calcium Hydroxide

| Additive | Additive (%)* | Time (hr) | Temperature (° C.) | g Lost I/ g Material*** |
|---|---|---|---|---|
| None** | — | — | — | 0.17 |
| Water** | — | 3 | 65 | 0.12 |
| Ca(OH)$_2$ | 4 | 3 | 65 | 0.06 |
| Ca(OH)$_2$ | 40 | 3 | 65 | 0.05 |
| Ca(OH)$_2$ | 40 | 21 | 65 | 0.06 |
| Ca(OH)$_2$ | 40 | 3 | 22 | 0.07 |

*Amount relative to weight of phenolic material initially contained in the sample.
**Comparative samples.
***Amount of iodine which remains unaccounted for after analysis for any soluble iodine or iodide.

The data of Table 4 demonstrate the effectiveness of calcium hydroxide for the present invention.

EXAMPLE 6

In this example, treatment with calcium sulfite is followed by treatment with calcium hydroxide. The various samples were prepared as in Example 4, but according to the parameters set forth in Table 5. For each sample utilizing the treatment agents, calcium hydroxide was added at the conclusion of the time period for reaction with the calcium sulfite. Furthermore, for each sample, the environment was maintained at a temperature of 45° C.

TABLE 5

Use of Calcium Sulfite and Calcium Hydroxide in a Sequential Process

| CaSO$_3$ Treatment | | Ca(OH)$_2$ Treatment | | |
|---|---|---|---|---|
| Amount Added* (%) | Time (hr) | Amount Added* (%) | Time (hr) | g Lost/ g Material*** |
| 0** | — | 0 | — | 0.100 |
| 5 | 3 | 5 | 1 | 0.061 |
| 5 | 3 | 5 | 3 | 0.054 |
| 10 | 3 | 5 | 1 | 0.056 |
| 10 | 3 | 5 | 3 | 0.051 |

*Amount relative to weight of phenolic material initially contained in the sample.
**Comparative sample.

The data of Table 5 demonstrate enhanced recovery of iodine, using a combination of reagents. Variation of reaction time and the level of calcium sulfite and calcium hydroxide did not significantly affect the results.

EXAMPLE 7

The basicity of certain reagents was examined in terms of the reagents' relative ability to recover iodine. The materials depicted in Table 6 were used to treat solutions identical to those used in Example 4, i.e., removal of mercury followed by recovery of iodine. The amount of each reagent was 0.2 grams. The following results were obtained:

TABLE 6

Basic Materials as Iodine Recovery Reagents

| Material | Water Solubility (g/100 cc) | Final pH of Treated Solution | g I Lost/ g Material** |
|---|---|---|---|
| None* | — | — | 0.137 |
| Water* | — | 4.36 | 0.095 |
| Ca(OH)$_2$ | 0.185 | 12.23 | 0.037 |
| CaO | 0.131 | 12.34 | 0.034 |
| CaCO$_3$ | 0.002 | 7.12 | 0.078 |
| Mg(OH)$_2$ | 0.001 | 8.86 | 0.058 |
| MgO | 0.001 | 7.33 | 0.082 |
| MgCO$_3$ | 0.011 | 7.96 | 0.059 |

*Comparative samples.
**Amount of iodine unaccounted for after analysis for any soluble iodine or iodide.

The data of Table 6 generally show that increased basicity leads to greater iodine recovery; and that lower water solubility resulted in weaker basicity and consequently, less ability to recover iodine.

In general, the pH for solutions being treated according to this invention should be at least about 7, and in some preferred embodiments, should be in the range of about 10 to about 12.5.

Other modifications and variations of this invention are possible in view of the description thus provided. It should be understood, therefore, that changes may be made in the particular embodiments shown which are within the scope of the invention defined in the appended claims.

All of the patents and articles mentioned above are incorporated herein by reference.

What is claimed is:

1. A method for removing iodine from an environment comprising a watery mixture of soil or solid waste materials containing iodine and iodine salts, said method comprising:

(a) adding water and a reagent to the environment to form a mixture, said reagent added in an excess of a stoichiometric equivalent of iodine present in the environment, wherein the reagent is selected from the group consisting of calcium sulfite, calcium hydroxide, calcium carbonate, calcium oxide, magnesium hydroxide, magnesium carbonate, magnesium oxide, and mixtures thereof;

(b) agitating said mixture at a temperature between about 20°–100° C. for about one half to sixteen hours at a pH of at least 7.0;

(c) washing the mixture with water after agitating is completed;

(d) separating from the soil or solid waste material, the water containing iodide ions and dissolved iodine containing compounds.

2. The method of claim 1, wherein the mixture is maintained at a temperature between about 30° C. to about 65° C.

3. The method of claim 1, wherein said mixture is agitated about 30 minutes to about 6 hours.

4. The method of claim 1, wherein the addition of calcium sulfite is followed by addition of calcium hydroxide.

5. A method according to claim 1 wherein the solid waste material is a phenolic resin.

6. A method according to claim 1 wherein the pH is maintained at least at 7.0 by addition of a reagent selected from the group consisting of calcium hydroxide, calcium carbonate, calcium oxide, magnesium hydroxide, magnesium carbonate, and magnesium oxide.

7. A method for removing iodine from an environment comprising a watery mixture of soil or solid waste materials containing iodine and iodine salts, said method comprising the steps of:

adding water and either calcium sulfite or calcium hydroxide to the environment to form a mixture, where the calcium sulfite or calcium hydroxide is added in an excess of a stoichiometric equivalent of iodine present in the environment; agitating said mixture at a temperature between about 20°–100° C. for about one half to sixteen hours at a pH of at least 7.0; washing said mixture with water after agitating is completed; and then filtering the mixture to separate the soil or solid waste material from the water containing iodine ions and dissolved iodine containing compounds.

* * * * *